(12) United States Patent
Karamanos

(10) Patent No.: US 7,444,731 B2
(45) Date of Patent: *Nov. 4, 2008

(54) METHOD FOR TRANSPORTING A PIPING STRUCTURE

(76) Inventor: John C. Karamanos, 1931 Patio Dr., San Jose, CA (US) 95125

( * ) Notice: Subject to any disclaimer, the term of this patent is extended or adjusted under 35 U.S.C. 154(b) by 0 days.

This patent is subject to a terminal disclaimer.

(21) Appl. No.: 11/567,301

(22) Filed: Dec. 6, 2006

(65) Prior Publication Data

US 2007/0108352 A1 May 17, 2007

Related U.S. Application Data

(63) Continuation of application No. 10/857,211, filed on May 28, 2004, now Pat. No. 7,165,797, which is a continuation-in-part of application No. 10/667,117, filed on Sep. 17, 2003, now Pat. No. 6,951,324.

(51) Int. Cl.
*B23Q 3/00* (2006.01)
*A45F 5/00* (2006.01)

(52) U.S. Cl. .......................................... 29/467; 294/142

(58) Field of Classification Search ................... 29/467, 29/468, 428; 248/68.1; 294/142
See application file for complete search history.

(56) References Cited

U.S. PATENT DOCUMENTS

| | | | |
|---|---|---|---|
| 1,429,776 A | 9/1922 | Robinson | |
| 1,793,059 A | 2/1931 | Chambers | |
| 2,233,273 A | 2/1941 | Di Vincenzo | |
| 2,534,690 A | 12/1950 | Young, Jr. et al. | |
| 2,999,605 A | 9/1961 | De Jarnett | |
| 3,216,025 A | 11/1965 | Roll | |
| 3,706,125 A | 12/1972 | Hopkins | |
| 3,778,537 A | 12/1973 | Miller | |
| 4,099,630 A | 7/1978 | Beck | |
| 4,123,012 A | 10/1978 | Hough | |
| 4,140,227 A | 2/1979 | Beck | |
| 4,163,372 A | 8/1979 | Frye et al. | |
| 4,193,563 A | 3/1980 | Vitale | |
| 4,244,542 A | 1/1981 | Matthews | |
| 4,261,529 A | 4/1981 | Sandberg et al. | |
| 4,541,602 A | 9/1985 | Potzas | |

(Continued)

FOREIGN PATENT DOCUMENTS

JP 62-008033 1/1987

(Continued)

*Primary Examiner*—John C Hong
(74) *Attorney, Agent, or Firm*—Townsend and Townsend and Crew LLP

(57) ABSTRACT

The invention is a method of transporting a pipe mounted within a plurality of brackets, each bracket having a body, an arm coupled to the body, a support guide located within the arm and configured to provide support to the pipe, a base coupled to the body and configured to attach a platform, the base further configured to provide support to the body, a spacer coupled to the body and configured to maneuver the bracket, wherein each bracket is configured to maintain support for the pipe while the bracket is maneuvered by the spacer. The method comprises the following. Position the plurality of brackets with the spacer proximate to the transporting surface. Set the spacer of each of the plurality of brackets on the transporting surface.

20 Claims, 6 Drawing Sheets

U.S. PATENT DOCUMENTS

| | | |
|---|---|---|
| 4,550,891 A | 11/1985 | Schaty |
| 4,779,815 A | 10/1988 | Moore et al. |
| 4,842,227 A | 6/1989 | Harrington et al. |
| 4,971,139 A | 11/1990 | Khattar |
| 5,016,843 A | 5/1991 | Ward |
| 5,050,824 A | 9/1991 | Hubbard |
| 5,417,243 A | 5/1995 | Ragona |
| 5,458,241 A | 10/1995 | Brown |
| 5,526,931 A | 6/1996 | White |
| 5,551,630 A | 9/1996 | Enoki et al. |
| 5,771,954 A | 6/1998 | Benner et al. |
| 5,850,037 A | 12/1998 | Mullins |
| 5,860,627 A | 1/1999 | Edwards |
| 5,986,562 A | 11/1999 | Nikolich |
| 6,135,381 A | 10/2000 | Teson |
| 6,142,405 A | 11/2000 | Black |
| 6,170,784 B1 | 1/2001 | MacDonald et al. |
| 6,536,516 B2 | 3/2003 | Davies |
| 6,578,319 B1 | 6/2003 | Cole et al. |
| D490,690 S | 6/2004 | Brass et al. |
| 6,951,324 B2 | 10/2005 | Karamanos |
| 7,140,236 B2 | 11/2006 | Karamanos |
| 7,165,797 B2 | 1/2007 | Karamanos |
| 7,387,013 B2 | 6/2008 | Karamanos |
| 2002/0080032 A1 | 6/2002 | Smith et al. |
| 2002/0088273 A1 | 7/2002 | Harness et al. |
| 2003/0050871 A1 | 3/2003 | Broughton |
| 2003/0085022 A1 | 5/2003 | Viso |
| 2003/0085023 A1 | 5/2003 | Viso |
| 2003/0171092 A1 | 9/2003 | Karamanos |
| 2003/0222185 A1 | 12/2003 | Rubenstein et al. |
| 2004/0159110 A1 | 8/2004 | Janssen |
| 2005/0039470 A1 | 2/2005 | Laing et al. |
| 2006/0249589 A1 | 11/2006 | Karamanos |

FOREIGN PATENT DOCUMENTS

| | | |
|---|---|---|
| JP | 02-035326 | 2/1990 |

METHOD FOR TRANSPORTING A PIPING STRUCTURE

CROSS-REFERENCES TO RELATED APPLICATIONS

This application is a continuation application of U.S. patent application Ser. No. 10/857,211, filed May 28, 2004, which is a continuation-in-part of U.S. patent application Ser. No. 10/667,117, filed Sep. 17, 2003 (U.S. Pat. No. 6,951,324), the entire disclosures of which are incorporated herein by reference for all purposes.

FIELD OF INVENTION

The invention relates generally to the field of hanger brackets and specifically to the shipping of heating, ventilation and air-conditioning (HVAC) piping structures.

BACKGROUND OF THE INVENTION

Heating, cooling, ventilating and air-conditioning systems (HVAC systems) in residential, commercial, education and research buildings are usually comprised of metallic pipes, hollow composite materials such as tubes, and the like. The systems are typically supported from and between floor or ceiling joists. The HVAC system typically includes a primary or main duct. A series of smaller branch or fluid-distributing ducts extending from the main duct are mounted between adjoining floor or ceiling joists. Such main and branch duct members are normally supported by metal hangers which are placed between the joists. Often pipe and conduit lines for transporting liquid or gas comprise the branch ducts and are suspended from ceiling joists or off the wall, typically with unistrut, all-thread rod, couplings, and various hanger brackets.

Piping and conduits that supply gas and/or liquids within buildings require careful preparation. Builders, or contractors, typically use ladders or scaffolding to reach areas where piping is routed and the installation may be cumbersome. Occasionally the pipe or conduits are prepared on the ground and installed by ladder as more complete assemblies. Ground preparation of pipe and conduit assemblies yields a more unwieldy structure, but ground preparation is often more practical.

After installation, a pressure check of the piping and conduit system often reveals leaks that are time-consuming and expensive to track down. The leaks must be found and repaired with the piping already having been installed.

What is needed is a system and method for reducing the likelihood of leaks, increasing the reliability of ground-assembled systems, and reducing the cost of conduit and pipe installation.

BRIEF SUMMARY OF THE INVENTION

The invention is a method of transporting a pipe mounted within a plurality of brackets, each bracket having a body, an arm coupled to the body, a support guide located within the arm and configured to provide support to the pipe, a base coupled to the body and configured to attach to a platform, the base further configured to provide support to the body, a spacer coupled to the body and configured to protect the pipe, wherein each bracket is configured to maintain support for the pipe while the bracket is maneuvered by the handle. The method comprises the following. Position the plurality of brackets with the handle proximate to a transporting surface. Set the handle of each of the plurality of brackets on the transporting surface.

One advantage of the invention is that the assembled base and pipe may be classified as a capital piece of equipment and depreciated accordingly. In the prior art, the structure could not be treated as such because the bulk of the cost is in assembly, whereas in the invention the assembly cost is built in to the cost of the product.

DETAILED DESCRIPTION OF THE INVENTION

The following description of the invention is not intended to limit the scope of the invention to these embodiments, but rather to enable any person skilled in the art to make and use the invention.

Figure 1:
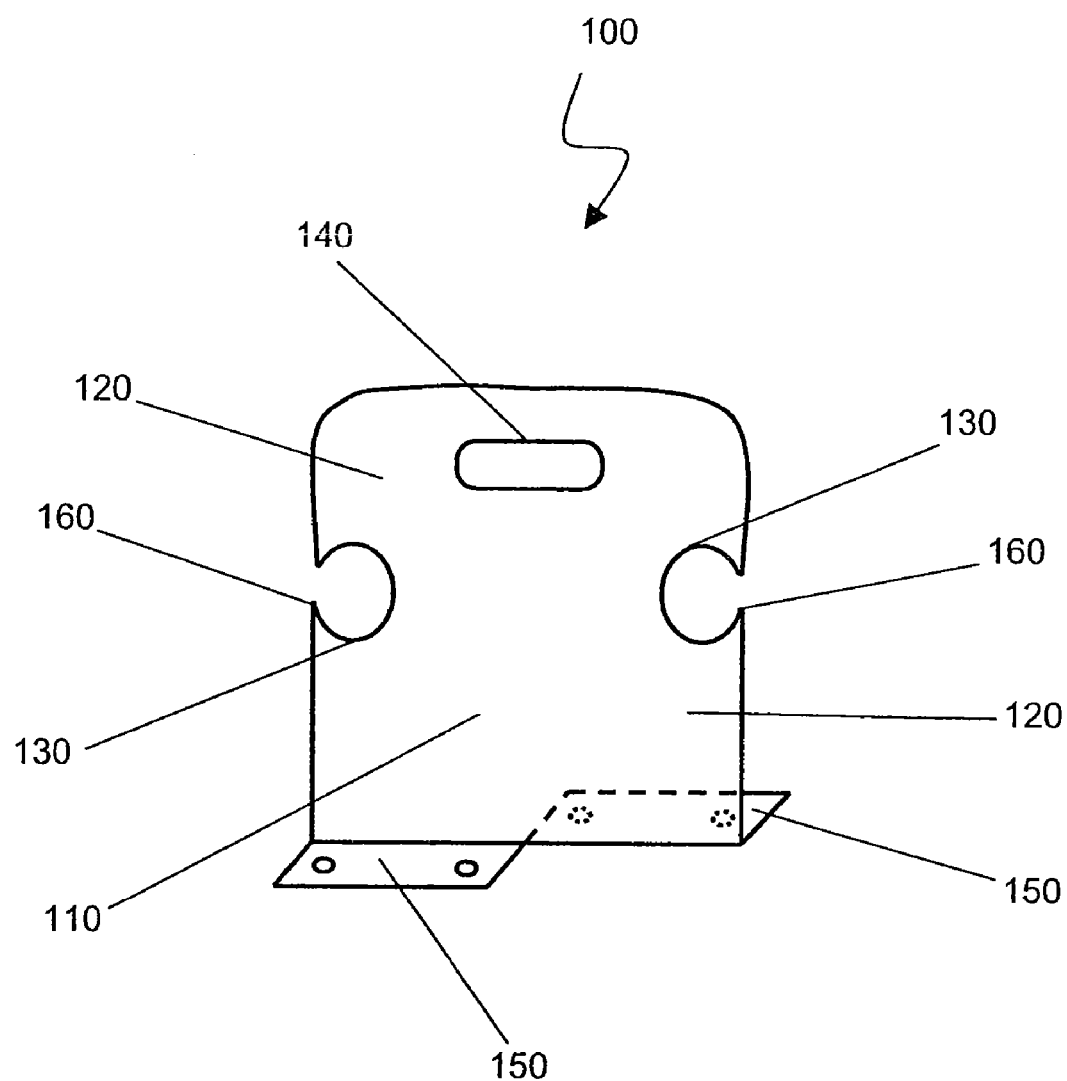
FIG. 1 is a diagram illustrating one embodiment of a bracket for pipe or conduit with a built-in handle.

FIG. 1 is a diagram illustrating a bracket for mounting and transporting pipe or conduit with a built-in handle. Bracket 100 includes body 110, arms 120 with support guides 130. Support guides 130 may secure pipes or conduits, and may include a grommet (not shown) to assist in securing the pipe. A pipe may be inserted into support guides 130 through either support guide opening 160, on the side of support guide 130, or directly through the larger opening of support guide 130. A retaining clip or U-clip, may be used to secure a pipe within support guide 130. The support guides support pipes by providing, either in combination with a grommet or without a grommet, friction along the pipe and maintaining alignment of the pipe at approximately 90 degrees to the plane of the bracket. One or more brackets may be used, in conjunction, to support one or more pipes. The brackets may also support, for example, electrical conduits, process pipe, fire sprinklers, cables, sheet metal duct work, and flex duct.

Spacer 140 connects to bracket 100 and enables bracket 100 and a completed bracket/pipe assembly (see FIG. 3) to be easily stored and transported. In one embodiment, spacer 140 is a handle that may be shaped and sized to best accommodate a human hand, a forklift, or any other lifting device. As a handle, spacer 140 may be lined with a gripping surface (not shown), for example neoprene and plastic, or be an upturned portion of the body. Although the following FIGURES illustrate the handle as a hold in the body, one of ordinary skill will recognize that a handle may be attached with, for example, screws, rivets, welding and bolts. Additionally, spacer 140 may be solid and not a handle at all, or may have some other shape.

Figure 3:
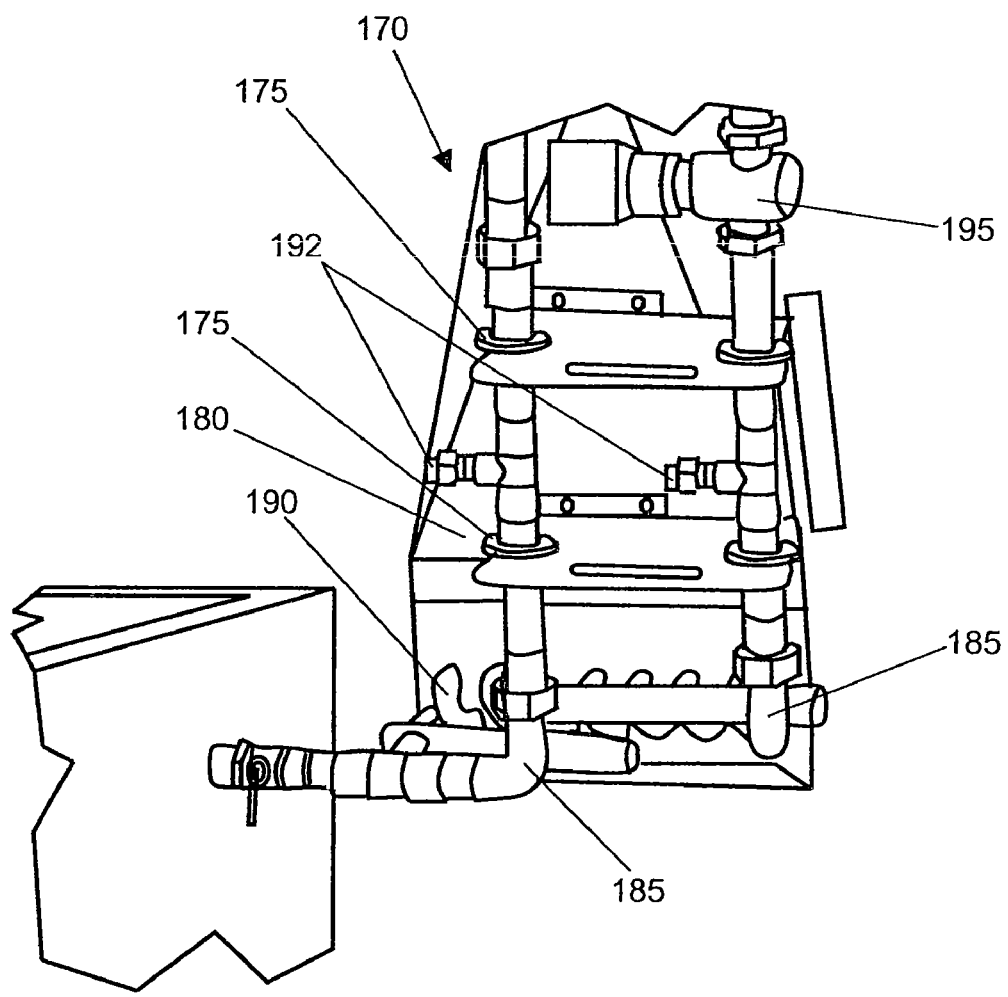
FIG. 3 is a diagram illustrating two mounting brackets from FIG. 2 supporting two pipes and attached to a duct.

Base 150 connects to body 110 and allows for bracket 100 to be mounted to a surface, for example a duct (see FIG. 3). Bracket 100 may be mounted in any secure manner, for example welded, screwed, and bolted.

In one embodiment, the bracket is made from 14-gauge steel, it is 8 inches wide and 8 inches high, with the base protruding by 1 inch. The bracket may be constructed from any appropriate material. A pipe may be inserted into support guides 130 through either support guide opening 160, on the side of support guide 130, or directly through the larger opening of support guide 130. A retaining clip may be used to secure a pipe within support guide 130. The brackets in the following FIGURES may have similar dimensions and be made out of the same variety of materials, or they may have dimensions appropriate to their use. Holes may be circular, octagonal, square, and any other appropriate shape.

One skilled in the art will recognize that the following FIGURES may not be drawn to scale with respect to the support guide openings, and that a conduit or pipe may be inserted into the bracket using multiple methods.

Figure 2:
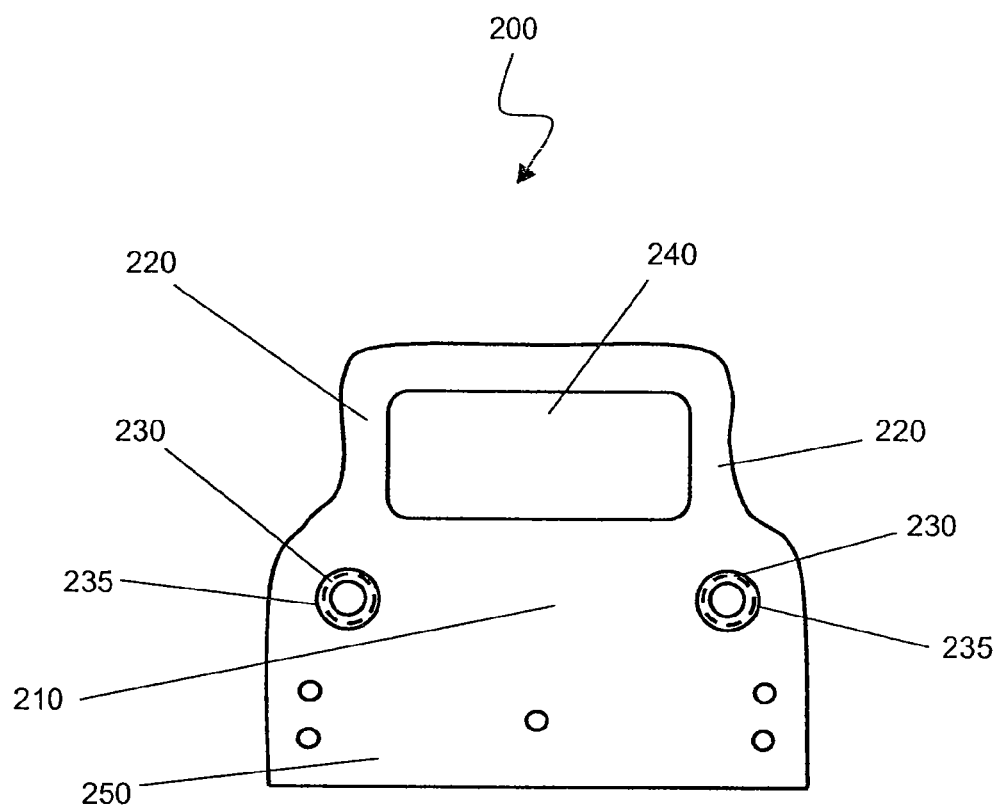
FIG. 2 is a diagram of another embodiment of a bracket and shipping support for pipe or conduit with a built-in handle.

FIG. 2 is a diagram illustrating another embodiment of a bracket for mounting and transporting pipe or conduit with a built-in handle. Bracket 200 includes body 210, arms 220 with support guides 230. Support guides 230 may secure pipes or conduits, and may include a grommet (not shown) to assist in securing the pipe. Spacer 240 connects to bracket 200 and enables bracket 200 and a completed bracket/pipe assembly (see FIG. 1B) to be easily maneuvered and transported. Spacer 240 may be a handle that is shaped and sized to best accommodate a human hand, a forklift, or any other lifting device. Spacer 240 as a handle may be lined with a gripping surface (not shown), for example neoprene or plastic. Base 250 connects to body 210 and allows for bracket 200 to be mounted to a surface, for example a duct (see FIG. 3). Bracket 200 may be mounted in any secure manner, for example welded, screwed, and bolted. Additionally, spacer 140 may be solid and not a handle at all, or may have some other shape.

FIG. 3 is a diagram illustrating two brackets from FIG. 1 supporting two pipes and attached to a duct. Assembly 170 includes brackets 175 mounted on duct 180. Brackets 175 may be brackets from FIG. 1 or 2, for example. Brackets 175 are supporting pipes 185. Pipes 185 may be, for example, conduits for gas or liquid, and have coil 190, pressure/temperature ports 192, and automatic temperature control valve 195, for example. Assembly 170 may be completed after mounting brackets 175 on duct 180 or prior to mounting. One problem with completing assembly 170 on the ground, for example, prior to mounting, is that assembly 170 may be manipulated by pipes 185, coil 190, pressure/temperature ports 192, and/or automatic temperature control valve 195 during mounting, resulting in damage to the seals between the components as well as damage to the components themselves. The damage may not be noticed until a pressure test of the entire system, after which locating a leak or malfunctioning parts may be time-consuming and costly. The invention solves this problem by providing a handle for manipulation that will preserve the relationship between the attached components (for example pipes 185, coil 190, pressure/temperature ports 192, automatic temperature control valve 195, strainer (not shown), circuit balancing valve (not shown), and ball valve (not shown) and provide support for assembly 170 so that completion may occur prior to mounting with a higher reliability for the integrity of the system. The handle will also help to eliminate damage to the parts themselves.

The pipes, valves, levers and coils, for example, in assembly 170 may be assembled within brackets 175 while the assembler is on the ground. One secured and supported within brackets 175, then handles 190 may be used to maneuver assembly 170 into position for mounting on duct 180. The coils, pipes, levers and valves of the assembly maintain their positional relationship better because they are not being handled and the assembly is not being manipulated by them.

Figure 4:
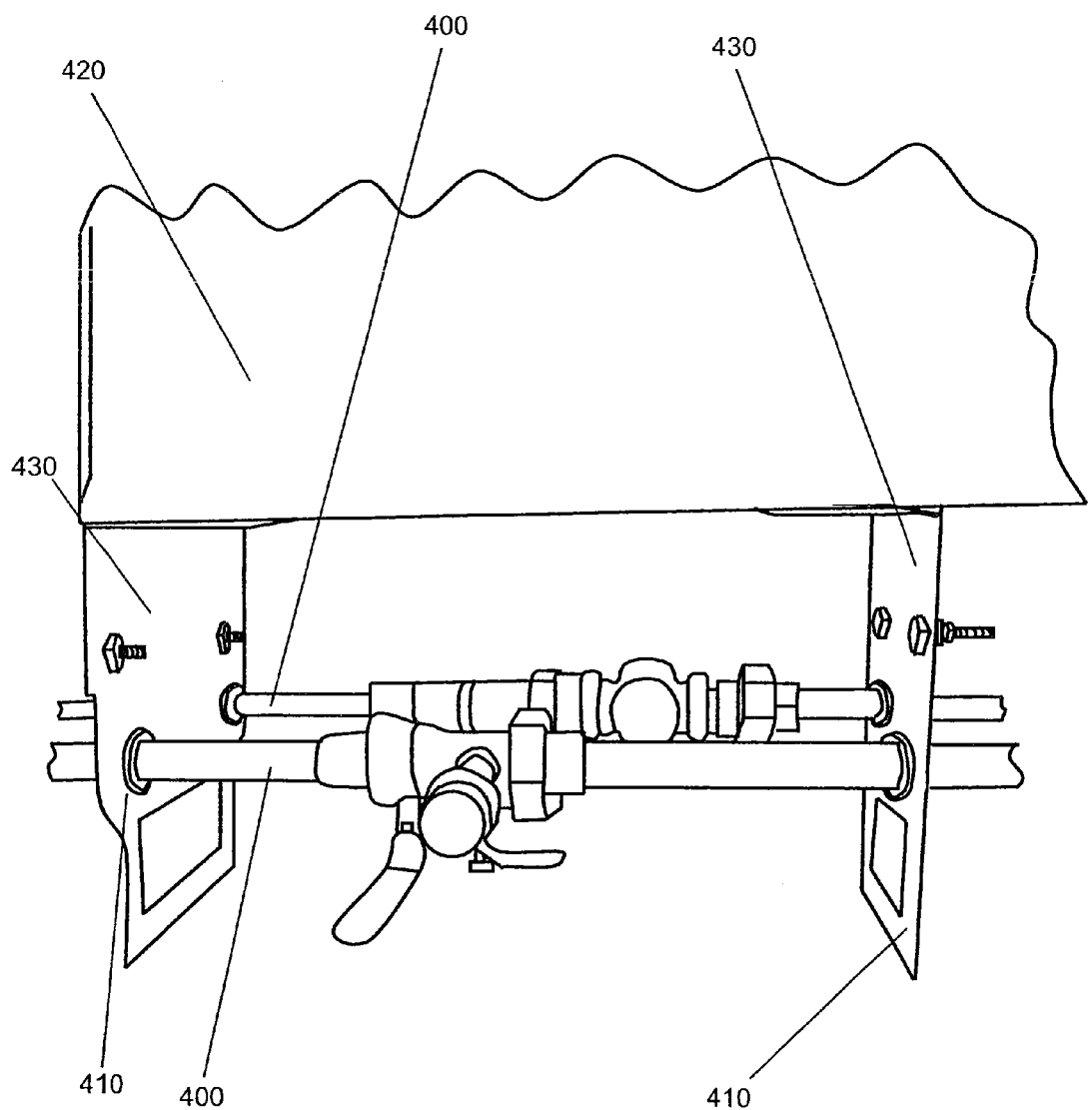
FIG. 4 is a diagram illustrating two brackets supporting a pipe assembly ready for transport.

FIG. 4 is a diagram illustrating two brackets supporting a pipe assembly ready for transport. Pipe assemblies 400 may include one or more pipes and associated hardware, such as valves, levers, strainers, etc. In FIG. 4, pipe assemblies 400 include 2 pipes and hardware, supported by brackets 410. Brackets 410 are illustrated in FIG. 2.

Brackets 410 provide a frame within which to secure pipe assemblies 400. After securing pipe assemblies 400, brackets 410 may be placed on their bases or upside down (as illustrated in FIG. 4), on their spacers. Positioned on their bases or spacers provides protection to pipe assemblies 400 and the hardware thereon. Also illustrated in FIG. 4 is duct 420, which may be transported with pipe assemblies 400. Brackets 410 are secured to duct 420 with L-brackets 430. Brackets 410 are positioned with the spacer providing support when including duct 420.

Brackets 410, pipes assemblies 400 and duct 420 may be loaded in shipping crates, individual boxes, on a flatbed truck, or any other appropriate transporting surface. Advantages of using brackets 410 for transporting include a decreased likelihood of damaging pipe assemblies 400, increased integrity in the alignment of pipe assemblies 400 to duct 420, and a convenient framework for packaging. Although FIG. 4 includes an illustration of duct 420, and therefore may not be transported on the base of brackets 410 (because the base is attached to L-brackets 430), if pipe assemblies 400 are not attached to duct 420 then they may be transported on the base of brackets 410.

The brackets as part of an overall assembled and tested conduit structure lower cost by providing an integral shipping support and contribute to the capital valve of the equipment. As capital equipment, an entire conduit and bracket assembly is deductible as a whole, with the labor included as part of the overall cost and therefore depreciable for financial purposes. This further increased the utility and value of the invention.

Figure 5:
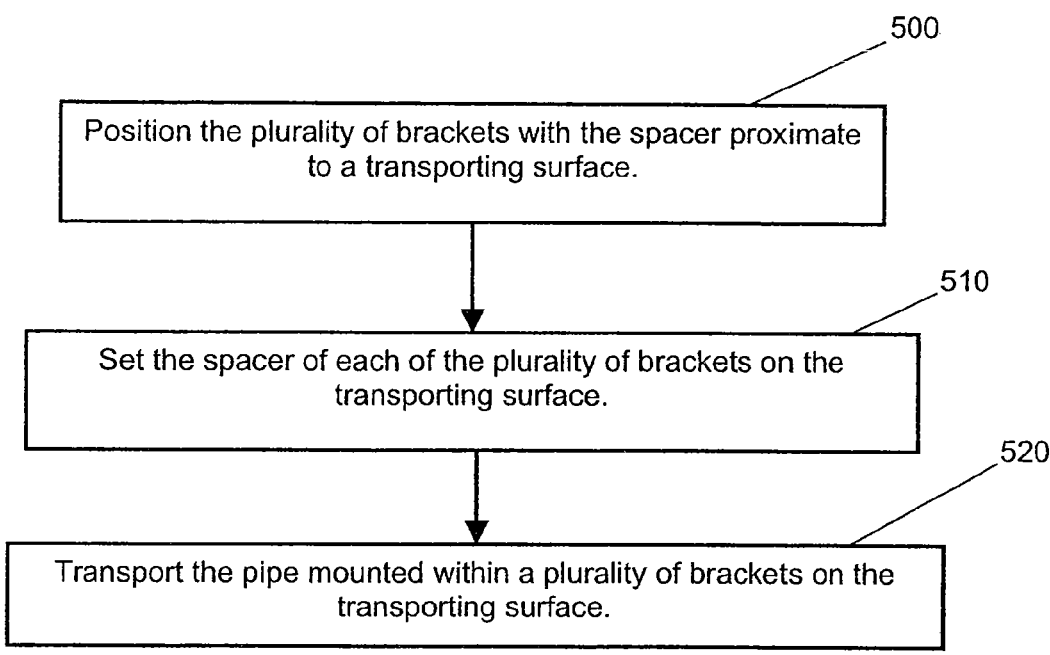
FIG. 5 is a flow diagram illustrating a method of transporting a pipe mounted within a plurality of brackets.

FIG. 5 is a flow diagram illustrating a method of transporting a pipe mounted within a plurality of brackets, each bracket having a body, an arm coupled to the body, a support guide located within the arm and configured to provide support to the pipe, a base coupled to the body and configured to attach to a platform, the base further configured to provide support to the body, a spacer coupled to the body and configured to maneuver the bracket, wherein each bracket is configured to maintain support for the pipe while the bracket is maneuvered by the spacer. In block 500, position the plurality of brackets with the spacer proximate to a transporting surface. In block 510, set the spacer of each of the plurality of brackets on the transporting surface. In block 520, transport the pipe mounted within a plurality of brackets on the transporting surface.

Figure 6:
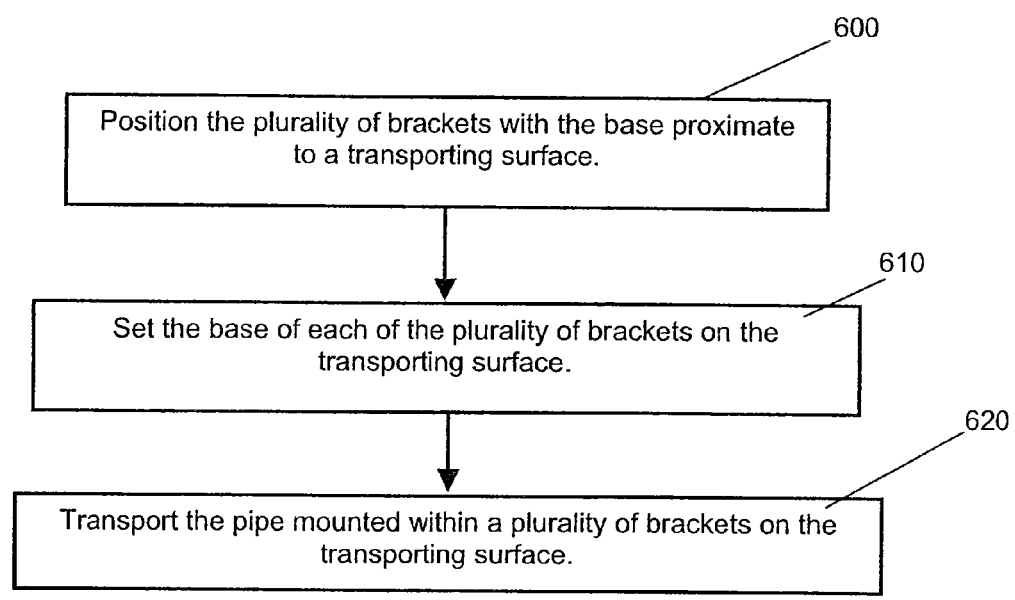
FIG. 6 is a flow diagram illustrating a method of transporting a pipe mounted within a plurality of brackets.

FIG. 6 is a flow diagram illustrating a method of transporting a pipe mounted within a plurality of brackets, each bracket having a body, an arm coupled to the body, a support guide located within the arm and configured to provide support to the pipe, a base coupled to the body and configured to attach to a platform, the base further configured to provide support to the body, a spacer coupled to the body and configured to maneuver the bracket, wherein each bracket is configured to maintain support for the pipe while the bracket is maneuvered by the spacer. In block 600, position the plurality of brackets with the base proximate to a transporting surface. In block 610, set the base of each of the plurality of brackets on the transporting surface. In block 620, transport the pipe mounted within a plurality of brackets on the transporting surface.

One skilled in the art will recognize from the previous description and from the figures and claims that modifications and changes can be made to the invention without departing from the scope of the invention defined in the following claims.

What is claimed is:

1. A method of transporting an HVAC pipe assembly, comprising:
   securing the HVAC pipe assembly to a bracket;
   mounting the bracket to an HVAC duct;
   positioning the bracket proximate to a transporting surface;
   loading the bracket to the transporting surface;
   transporting the HVAC pipe assembly by transporting the transporting surface;
   maintaining alignment of the HVAC pipe assembly to the HVAC duct with the bracket while trans porting the HVAC pipe assembly.

2. The method according to claim 1, wherein the HVAC pipe assembly comprises a member selected from the group consisting of a liquid conduit, a gas conduit, a coil, a pressure/temperature port, and an automatic control valve.

3. The method according to claim 1, wherein the HVAC duct comprises a member selected from the group consisting of a main duct, a primary duct, a branch duct, a pipe line, and a conduit line.

4. The method according to claim 1, wherein the bracket comprises a handle.

5. The method according to claim 1, wherein the bracket comprises a spacer.

6. The method according to claim 1, comprising securing the HVAC pipe assembly to the bracket with a grommet.

7. The method according to claim 1, comprising inserting the HVAC pipe assembly through a support guide of the bracket.

8. The method according to claim 1, wherein the transporting surface comprises a member selected from the group consisting of a human hand, a forklift, a lifting device, a shipping crate, a box, and a flatbed truck.

9. A method of supporting an HVAC pipe assembly, comprising:
   securing the HVAC pipe assembly to a bracket;
   mounting the bracket to an HVAC duct;
   positioning the bracket proximate to a transporting surface;
   loading the bracket to the transporting surface;
   maintaining alignment of the HVAC pipe assembly to the HVAC duct by supporting the HVAC pipe assembly with the bracket.

10. The method according to claim 9, comprising maintaining alignment of the HVAC pipe assembly to the HVAC duct with the bracket while transporting the HVAC pipe assembly.

11. The method according to claim 9, wherein the HVAC pipe assembly comprises a member selected from the group consisting of a liquid conduit, a gas conduit, a coil, a pressure/temperature port, and an automatic control valve.

12. The method according to claim 9, wherein the HVAC duct comprises a member selected from the group consisting of a main duct, a primary duct, a branch duct, a pipe line, and a conduit line.

13. The method according to claim 9, wherein the bracket comprises a handle.

14. The method according to claim 9, wherein the bracket comprises a spacer.

15. The method according to claim 9, comprising securing the HVAC pipe assembly to the bracket with a grommet.

16. The method according to claim 9, comprising inserting the HVAC pipe assembly through a support guide of the bracket.

17. The method according to claim 9, wherein the trans porting surface comprises a member selected from the group consisting of a human hand, a forklift, a lifting device, a shipping crate, a box, and a flatbed truck.

18. A method of transporting an HVAC pipe assembly, comprising:
   securing the HVAC pipe assembly to a bracket, the HVAC pipe assembly comprising a pipe and a coil;
   positioning the bracket proximate to a transporting surface;
   loading the bracket to the transporting surface;
   transporting the HVAC pipe assembly by transporting the transporting surface;
   maintaining alignment of the HVAC pipe assembly pipe and the HVAC pipe assembly coil while transporting the HVAC pipe assembly.

19. The method according to claim 18, wherein the transporting surface comprises a member selected from the group consisting of a human hand, a forklift, a lifting device, a shipping crate, a box, and a flatbed truck.

20. The method according to claim 18, comprising mounting the bracket on an HVAC duct.

* * * * *